United States Patent [19]
Mitchell et al.

[11] 3,832,446
[45] Aug. 27, 1974

[54] SALT CRYSTAL CONGLOMERATES

[75] Inventors: Richard R. Mitchell, Factoryville, Pa.; Robert van den Bor, Hengelo, Netherlands

[73] Assignee: Akzona Incorporated, Asheville, N.C.

[22] Filed: Sept. 27, 1971

[21] Appl. No.: 184,198

[52] U.S. Cl................................. 423/267, 423/499
[51] Int. Cl............................. C01b , C01c , C01d , C01f
[58] Field of Search ........... 423/499, 179, 267, 265; 252/385, 383; 23/303, 313

[56] References Cited
UNITED STATES PATENTS

| | | | |
|---|---|---|---|
| 2,947,603 | 8/1960 | Miller | 252/385 X |
| 2,965,444 | 12/1960 | Diamond | 423/267 |
| 3,009,775 | 11/1961 | Ladenburg et al. | 423/499 X |
| 3,036,884 | 5/1962 | Kaufmann | 252/385 X |
| 3,240,558 | 3/1966 | Heiss et al. | 423/499 X |
| 3,396,113 | 8/1968 | Jacoby et al. | 423/267 X |
| 3,490,744 | 1/1970 | Binsley | 252/383 |

*Primary Examiner*—Oscar R. Vertiz
*Assistant Examiner*—Ethel R. Cross
*Attorney, Agent, or Firm*—Francis W. Young; Tom R. Vestal

[57] ABSTRACT

The disclosed invention relates to a compacted conglomeration of salt crystals treated with a solution containing complex iron cyanide ions.

10 Claims, No Drawings

SALT CRYSTAL CONGLOMERATES

The use of salt to regenerate ion exchange media is known, for example, in water softening systems. In such a process, salt is placed in a dissolving tank dissolved in water, and the resulting brine used to regenerate natural or synthetic ion exchange materials.

The salt used for such a process may come in a variety of forms - minute salt crystals, rock salt, and compacted salt conglomerates are examples. Coarse rock salt and compacted salt conglomerates are preferred in that their size allows free movement of the brine solution in and around them, permitting more surface area contact, thereby enhancing the dissolving process.

The method of mechanically compacting salt into conglomerates is known in the art. Essentially, loose salt fines or crystals are placed under great pressure in a confined space to form a bond between the various segments. This may be done by the use of continuous rollers, forming a flat sheet of compacted salt which may be broken into the desired size later. Cavities may be placed in the rollers as desired so that compacted salt tablets or buttons are formed by this process. Also, punch-and-die presses may be used.

It has been experienced when using such mechanically compacted salt conglomerates in a brine solution that exposure to the aqueous solution for long periods of time has a tendency to weaken the mechanical bond between the salt crystals. This weakening may cause the compacted salt to crumble or mush. As the mushed salt accumulates, the permeability of the solid phase decreases and brine production capacity is reduced, thereby affecting the efficiency of the brine system itself.

An object of this invention is to reduce substantially or eliminate mushing of roll-compacted salt in brine solutions.

Another object of this invention is to provide a method for treating mechanically compacted salt conglomerates to improve cohesiveness between the particles of the conglomerates.

Another object of this invention is to provide a method for treating salt particles to eliminate or substantially reduce disintegration of the particles when placed in an aqueous solution.

The addition of small amounts of one or more water soluble complex iron cyanides to bulk salt or sodium chloride to inhibit caking or freezing of the salt under certain conditions is known, for instance, from U.S. Pat. Nos. 3,036,884 and 3,558,512. Because of the anti-caking tendencies of these compounds, rock or evaporated salt previously treated with these or similar anti-caking additives and subsequently subjected to roll compaction results in an uncompacted and unsatisfactory product. Thus, it was completely unexpected to discover that treatment with complex iron cyanides after compaction yielded a product with an increased wet strength of 300 percent −500 percent over similar untreated salt buttons containing no complex iron cyanide additive.

Compounds used for the present invention are the same as those mentioned in U.S. Pat. No. 3,036,884 mentioned earlier, the general formula of the group being $$M (Fe (CN)_5 X)$$

where M represents one or more cations which may be chosen at random in proportion to the selected cation combination, and where X is one of the groups CN, CO, NO, $NO_2$, $NH_3$, $H_2O$, $SO_3$, $S_2O_3$, or a more complex group forming an anion together with the Fe $(CN)_5$ groups. X preferably is a CN group which, together with the chosen cation, forms a soluble salt. Preferred complex iron cyanide compounds come from the group consisting of alkali metal ferrocyanides, alkaline earth metal ferrocyanides, alkali metal ferricyanides, and alkaline earth metal ferricyanides.

The compacted salt conglomerates may be surface treated by dipping, spraying or otherwise coating the conglomerates with iron cyanide ions in an aqueous solution. Best results have been obtained with deep penetration of the solution into the conglomerates. The residual iron cyanide ion concentration remaining in the conglomerate should range from 10 to 1000 parts per million to obtain the desired results. Experiments have shown the preferred range of concentration of the iron cyanide ions to be 50 to 100 parts per million.

It has also been found that a solution of iron cyanide ions added to the brine solution will be absorbed by particular salt in the solution, also producing the anti-mushing effect desired.

EXAMPLE 1

Consumption salt of an average grain size of 0.4 mm was mechanically compacted into sheets of 8 mm thickness. The sheets were then broken and sieved and lumps of 6 to 12 mm were retained. The lumps were then fed by belt conveyor to a sprayer containing a solution of 3 g/l of $K_4$ (Fe $(CN)_6$) and water. The lumps were then dried leaving salt crystal conglomerates containing 12 mg of potassium ferrocyanide per kg of consumption salt.

In a 400 ml beaker, 270 g of treated salt crystals and 200 ml of water were added. A similar beaker was prepared using untreated salt crystals. At specified periods of time, the liquid was poured off and the salt conglomerates were placed under pressure in a steel cylinder. The following results were noted:

| Residence Time in Beaker in Weeks | 1 | 2 | 3 | 4 |
|---|---|---|---|---|
| Treated Salt Crystal Strength in Kg | 28 | 8 | 13 | 13 |
| Untreated Salt Crystal Strength in Kg | 2 | 3 | 2 | 2 |

EXAMPLE 2

Salt buttons in 20 pound lots were sprayed with a sodium ferrocyanide and water solution and were stored for a period of time in covered containers. After drying, the buttons contained 50 ppm (anhydrous) of sodium ferrocyanide compound. The buttons were then sieved to remove all fines and placed in jar and water was added to the jar, soaking the buttons. The buttons were thereafter tested for wet strength and compared with untreated buttons exposed to similar conditions. The following results were obtained:

| Number of Hours Treated Before Soaking | Wet Strength Treated (psi) | Wet Strength Untreated (psi) |
|---|---|---|
| 1 | 68.0 | 16.0 |
| 1 | 72.0 | 19.0 |
| 4 | 78.5 | 10.5 |
| 4 | 87.9 | 24.1 |
| 24 | 86.5 | 19.5 |
| 24 | 89.9 | 13.8 |

-Continued

| Number of Hours Treated Before Soaking | Wet Strength Treated (psi) | Wet Strength Untreated (psi) |
| --- | --- | --- |
| 72 | 80.0 | 19.0 |
| 72 | 81.5 | 21.0 |

What is claimed is:

1. A roll-compacted salt conglomerate having increased wet strength wherein the salt conglomerate is coated with a complex iron cyanide in a concentration of not less than ten parts per million.

2. The salt conglomerate of claim 1 wherein the concentration is less than 1000 parts per million.

3. The salt conglomerate of claim 1 wherein the concentration is between 50 and 100 parts per million.

4. The salt conglomerate of claim 1 where the complex iron cyanide is a member of the group consisting of alkali metal ferrocyanides, alkaline earth metal ferrocyanides, alkali metal ferricyanides, and alkaline earth metal ferricyanides.

5. The method of manufacturing compacted salt conglomerates with anti-mushing characteristics, comprising the steps of roll-compacting salt particles into conglomerate form and thereafter surface treating the conglomerate with an aqueous solution containing complex iron cyanide ions to impart to said conglomerate a residual iron cyanide concentration of 10 to 1000 parts per million.

6. The process of claim 5 wherein said residue concentration is between 50 and 100 parts per million.

7. The process of claim 5 wherein said treating step comprises spraying the aqueous solution onto said compacted conglomerates.

8. The process of claim 5 wherein said complex iron cyanide has the formula $M(Fe(CN)_5 X)$, where M represents one or more cations which may be chosen at random in proportion to the selected combination, and X is a radical selected from the group consisting of $CN_1$, $CO_1$, $NO_1$, $NO_2$, $NH_3$, $NH_2$, $H_2O$, $SO_3$, and $S_2O_3$.

9. The process of claim 5 where the complex iron cyanide is a member of the group consisting of alkali metal ferrocyanides, alkaline earth metal ferrocyanides, alkali metal ferricyanides, and alkaline earth metal ferricyanides.

10. The process of claim 5, wherein said treating step comprises dipping said compacted conglomerates into said aqueous solution.

* * * * *